United States Patent Office 3,546,730
Patented Dec. 15, 1970

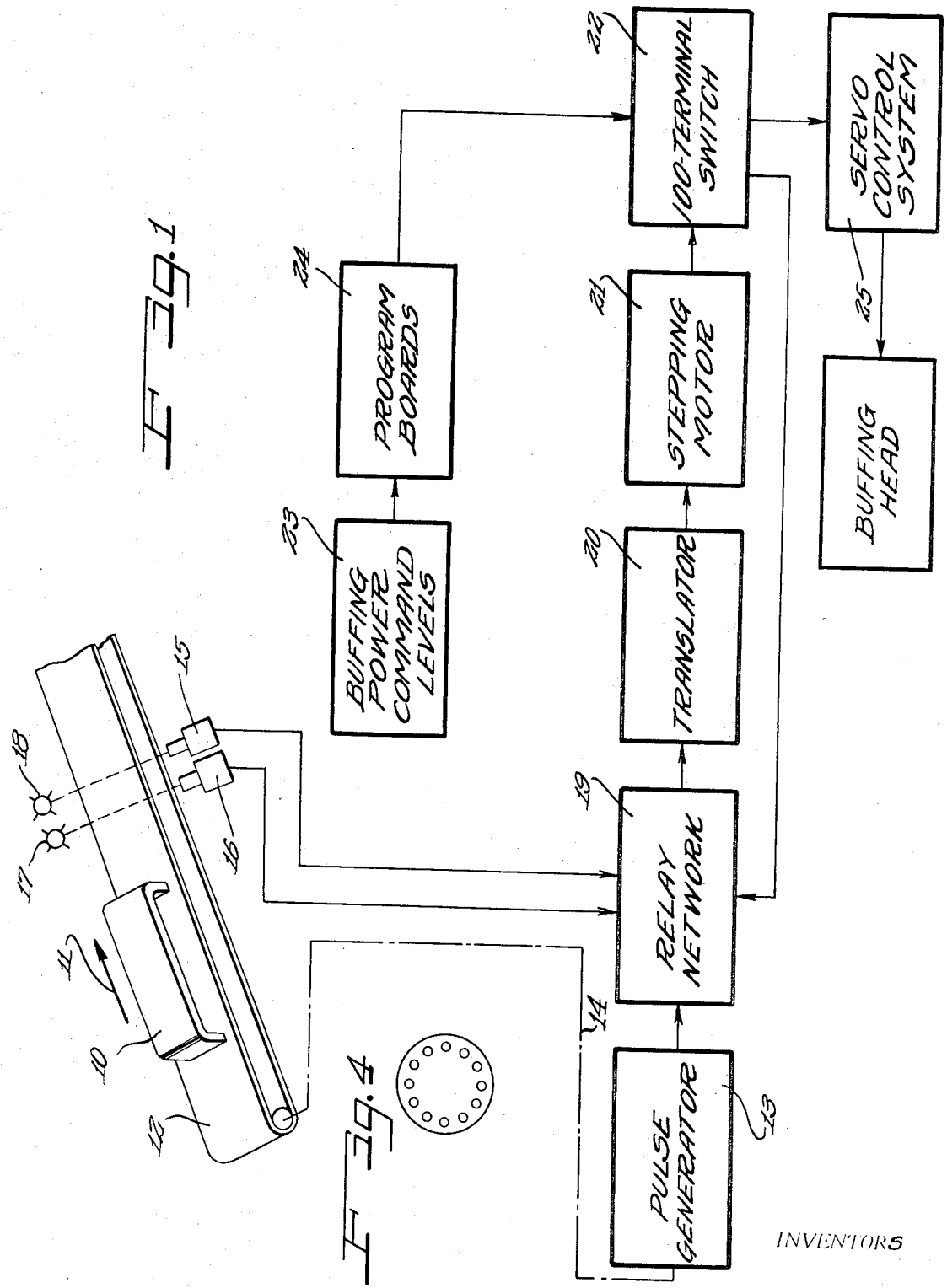

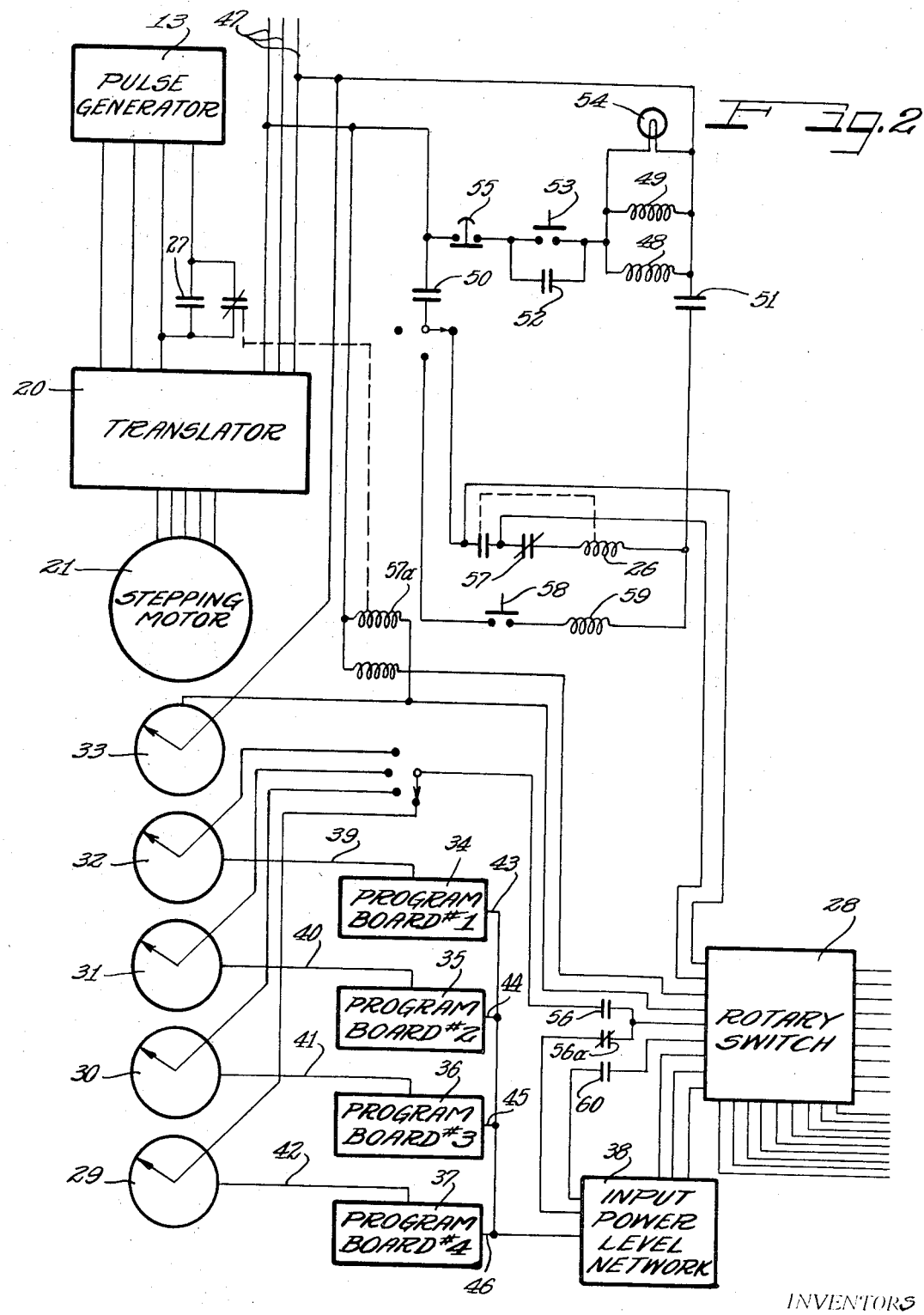

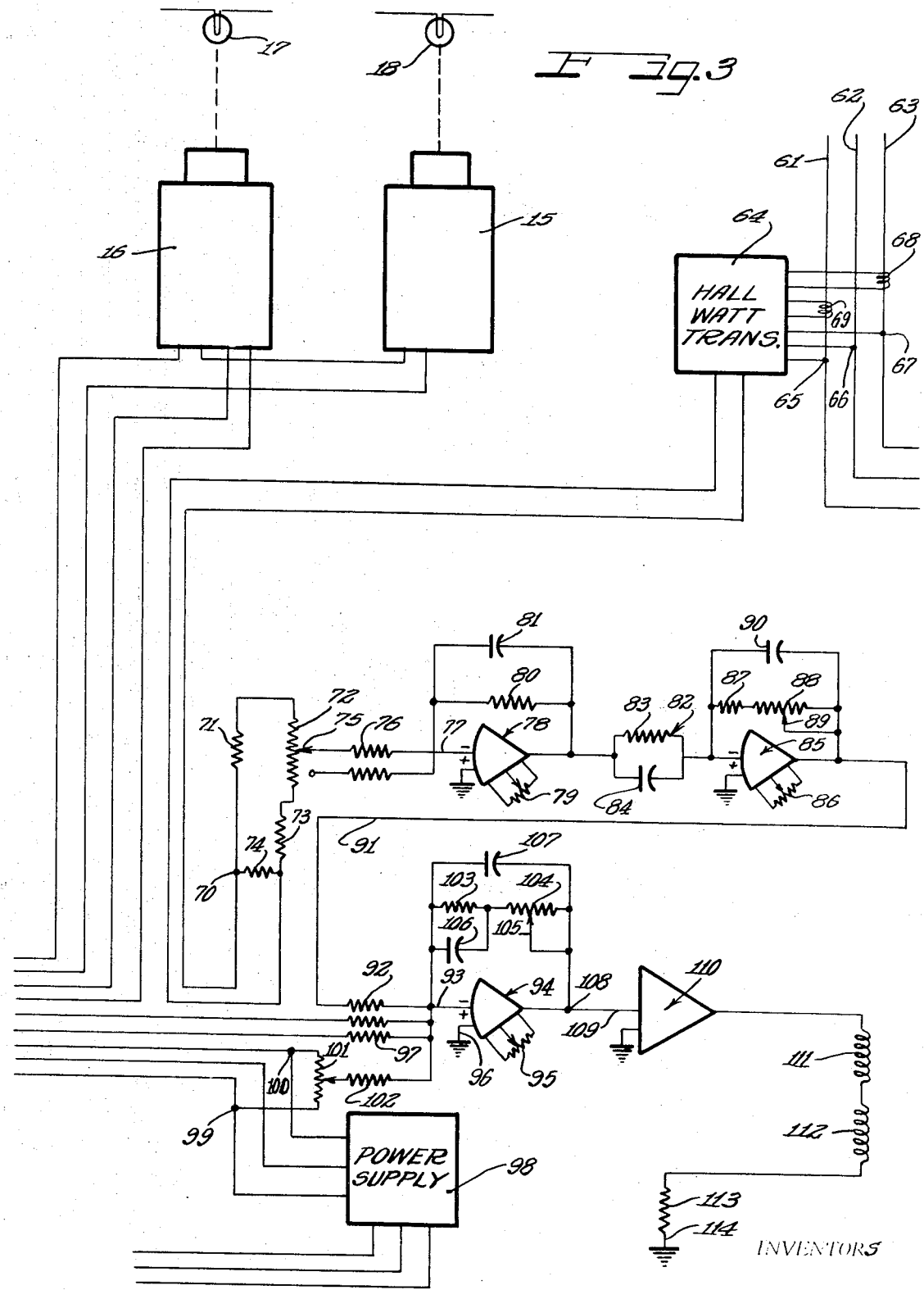

3,546,730
AUTOMATIC BUFFING CONTROL SYSTEMS
Glenn J. Eggert and Mervyn E. Nicholls, Columbus, Ohio, assignors, by direct and mesne assignments, to Houdaille Industries, Inc., Buffalo, N.Y., a corporation of Delaware
Filed May 20, 1968, Ser. No. 730,438
Int. Cl. B24b 29/00
U.S. Cl. 15—102                                 11 Claims

ABSTRACT OF THE DISCLOSURE

An automatic buffing control system including means for programming desired buffing power levels to the contour of an object being buffed which object is being carried by a continuously moving conveyor past a buffing head. The desired buffing levels are programmed to each incremental length of the object to be buffed, and the programmed buffing level is maintained by means of a control system. The control system includes means for sensing power delivered to the buffing motor and for generating a signal in response thereto. This signal is differentiated and combined with the program information to develop an error signal which in turn is used to increase or decrease the contact of the buffing wheel with the product being buffed.

BACKGROUND OF THE INVENTION

Field of the invention

The field of art to which this invention pertains is an automatic buffing control system, and in particular, to a buffing control system utilizing a programming means for selecting desired buffing power levels for each incremental movement of an object being buffed and to a servo system for controlling the power applied to a buffing head to maintain the pre-programmed buffing power level.

SUMMARY

It is an important feature of the present invention to provide an improved control system for automatically regulating the power applied to a buffing head in accordance with a predetermined programmed power schedule.

It is also a feature of the present invention to provide an improved buffing control system which subdivides the object being buffed into a number of incremental length units and which pre-programs a power level for each incremental unit as it passes beneath the buffing wheel and which continuously monitors the power of the buffing wheel to assure that the programmed power is applied as required.

It is an important object of the present invention to provide an improved program and control buffing system for buffing an irregularly contoured object continuously moving on a conveyor means.

It is an important object of the present invention to provide an improved program circuit for use in conjunction with a servo control system for an automatic buffing device.

It is another object of the present invention to provide a control system for a buffing device which includes a program circuit for instantaneously applying a predetermined power level to a buffing wheel and a servo control system for maintaining the pre-programmed power level for the time duration required.

It is a further object of this invention to provide a control system for a buffing device which includes a program circuit having a pulse generator for generating a series of signals in sequence which are keyed to the feed speed of the conveyor and which circuit is coupled to a control circuit utilizing a power transducer for generating a signal in response to the input power applied to the buffing motor and for utilizing the response in combination with the pre-programmed power signal for driving a servo device to regulate the contact pressure of a buffing head with the product being buffed.

These and other objects, features and advantages of the present invention will be understood in greater detail from the following description and associated drawings wherein reference numerals are utilized to designate an illustrative embodiment.

BRIEF DESCRIPTION OF THE DRAWINGS

FIG. 1 is a block diagram of a buffing control system utilizing features of the present invention;

FIG. 2 is a schematic and partial block diagram showing the program circuit of the automatic buffing control system shown in FIG. 1, and FIG. 3 is a schematic which is coupled to FIG. 2 where indicated and which shows the control servo system illustrated in FIG. 1.

FIG. 4 is a detail view of the rotatable disc set forth in claim 8.

DESCRIPTION OF THE PREFERRED EMBODIMENT

The present invention contemplates the use of an automatic circuit for regulating the power delivered to a buffing head as an object being buffed passes beneath the head as further described in co-pending applications entitled "Control Circuit for Automatic Buffing Equipment," Ser. No. 714,632, filed Mar. 20, 1968, and "Program Circuit for Automatic Buffing Equipment," Ser. No. 730,445, and filed of even date herewith. For instance, an irregularly contoured object, such as an automobile bumper may be moved along a conveyor system and beneath a buffing head in accordance with the present invention. Once the control circuit senses the presence of the bumper at the buffing head, a series of pulses are generated which are used as control signals to operate a stepping motor. The stepping motor then rotates a rotary switch having one hundred terminals, for instance. Each of these terminals are coupled to a power level source which is preseletced to be the optimum power for the buffing head when the associated portion of the moving bumper reaches the head. In other words, each of the pulses generated by the pulse generator corresponds to a given increment of the bumper beneath the buffing head in its forward travel. Each of these pulses are then utilized to select a given power level for the buffing head in accordance with the known contour of the bumper. In this way, the buffing operation is fully automatically programed for optimum results.

A control system in which the program circuit of the present invention is operative is shown diagrammatically in FIG. 1. In particular, an object such as a bumper 10 may be moved in the direction of the arrow 11 along a continuously moving conveyor 12. A pulse generator 13 is mechanically coupled by means of linkages or the like illustrated by the reference numeral 14 to the movement of the conveyor 12. In this way, a pulse is generated when each incremental length of the conveyor passes beneath the buffing head.

A pair of photo relays indicated generally by the numerals 15 and 16 are actuable by the interruption of a light beam from light sources 17 and 18, respectively. The interruption of the beam is provided by the moving bumper 10 along the conveyor 12.

When the relays 15 and 16 detect the presence of the bumper 10 beneath the buffing head, the relay network 19 is actuated, and the output signals from the pulse generator 13 are coupled to a translator 20. The translator 20 detects the incoming signals and generates an appropriate response for controlling a stepping motor 21 which in turn actuates a one hundred terminal rotary switch 22. A series of buffing power levels, for instance, ten levels, 23 is coupled by means of a program board 24 to the one hundred terminal switch. The program board, for instance, may contain one hundred contacts, each being established at a given power level and each being coupled to one terminal of the one hundred terminal rotary switch. In this way, the output of the rotary switch 22 will be a program signal having an instantaneous power level which corresponds to the optimum desired buffing power at the bumper 10. This power level is then coupled to a servo control system 25 for increasing or decreasing the degree of contact of the buffing wheel at the bumper 10.

Referring to FIG. 2, the pulse generator 13 is shown coupled to the translator 20 and hence to the stepping motor 21.

A basic concept behind the programming system is to divide the bumper 10 into one hundred length increments and to provide a choice of ten buffing horsepowers for each increment of bumper length. The pulse generator 13 is the element of the system which divides the bumper into increments. It does this by generating pulses at a rate proportional to the speed of the conveyor.

As long as the conveyor 12 is running, the pulse generator 13 is putting out square wave pulses, but the pulses are only used when a bumper, such as the bumper 10, is in the correct position for buffing. When a bumper reaches the buffing head, the bumper detector, 15 and 16, signals the start of a program. It does this with the two photo electric relays 15 and 16 as illustrated in FIG. 1. When the bumper interrupts the light to both photo relays, another relay 26 is energized. Through normally open contacts 27, on the relay 26, the pulses go from the pulse generator to the translator 20.

The translator 20 senses the negative rate of change of voltage associated with each square wave pulse and converts these pulses into the proper signal to drive the stepping motor 21. The stepping motor steps 3.6°, for example, for every negative change in voltage.

Coupled to the stepping motor 21 is a one hundred terminal rotary switch 22 which includes five terminal levels 29, 30, 31, 32 and 33. Each of the one hundred terminals on a given level, such as the level 32, represents an increment of bumper length. For each bumper that is buffed, the stepping motor drives the switch through one revolution. Each of these one hundred terminals contains a voltage corresponding to a command for a particular buffing horsepower. The wiper of the switch passes over the terminals as the bumper passes under the buff. It picks off the buffing command voltage for each increment and sends it to the servo amplifier which causes the buffing wheel to be pressed harder or less hard against the bumper, depending on the horsepower level commanded.

The voltages to each of the one hundred terminals on the rotary switch are obtained from program boards 34, 35, 36 and 37 and from an input power level network 38. The program boards are made up of one hundred vertical wires illustrated by the wires 39, 40, 41 and 42 and ten horizontal wires illustrated by the wires 43, 44, 45 and 46. Each of the 100 vertical wires is connected to a corresponding terminal on the rotary switch, and corresponds to a particular station along the length of the bumper 10. Each of the ten horizontal wires has a different voltage on it from the input power level network 38. By inserting a shorting pin in a hole in the respective program board, a connection is made between a horizontal wire and a vertical wire. Thus, there is a choice of ten voltages for each of the one hundred terminals on the rotating switch. In this way, the program board is used to give a buffing horsepower command for each increment of bumper length.

The programmer will only go into an automatic cycle if the conveyor is running since means are provided to establish a zero voltage level at terminals 47 if the conveyor is off and a normal 115 volt level if the conveyor is on. Also, the "start" button must have been pressed after the conveyor has started. In this way, relays 48 and 49 may be energized closing contacts 50, 51 and 52. The "start" button is indicated by the reference numeral 53. A signal lamp 54 is coupled in parallel with the relays 48 and 49.

If the above two described conditions are satisfied, the two photo relays 15 and 16 will detect the presence of a bumper by energizing the relay 26, and the automatic cycle will start. Pulses will go to the translator 20; the stepping motor will turn the switch 28, and the buffing horsepower will be controlled by the position of the shorting pins on the program boards 34, 35, 36 and 37.

The cycle can be interrupted in two ways, by pressing a "stop" button 55 or by turning off the conveyor to bring the voltage at the terminals 47 to zero. Either of these conditions deenergizes the relays 48 and 49 and through a pair of contacts 56, the wire carrying the voltages from the rotary switch and program boards is opened.

The automatic cycle stops itself when the stepping motor 21 and the rotary switch 22 have made one complete revolution and the bumper has passed. When this revolution is completed, contact is made on terminal number one of the control level 33 of the rotary switch 22, and pulses are prevented from going to the translator 20. After the cycle is completed, the buffing command voltage still comes from the rotary switch 22, therefore, the first pin in the program board must call for an up command.

Manual operation may be achieved by rotating the contact 58a to the position 58b and using a switch 58 which when closed energizes a relay 59 for closing a pair of normally open contacts 60, thereby applying a given power level to the control system 25 (FIG. 1).

In FIG. 3, three phase power may be applied to the buffing motor of the present invention through a series of lines 61, 62 and 63. A power transducer 64 is coupled to each of the lines 61, 62 and 63 at terminals 65, 66 and 67, respectively. In addition, the current through two of the three phases such as the phases 61 and 63 sensed through a pair of coils 68 and 69 in a well understood manner.

The transducer 64 then generates a first signal at a terminal 70. The signal at the terminal 70 is then applied across a voltage divider which consists of a number of resistors 71, 72 and 73. A resistor 74 is coupled in parallel with resistors 71, 72 and 73 to provide a given output load for the device 64.

A movable contact 75 which together with the resistor 72 comprises a potentiometer, couples the first signal through a resistor 76 to the input 77 of an amplifier 78. The amplifier 78 is provided with a balance potentiometer 79.

A filter which includes a resistor 80 and a parallel connected capacitor 81 is coupled across the amplifier 78 for filtering out high frequency signal components which may have originated in the sensor of the buffing motor power input.

The output of the amplifier 78 is then coupled to an RC network 82 which includes a resistor 83 and a capacitor 84. The output of the amplifier 78 is differentiated through the capacitor 84 and combined with the first signal at the input of an amplifier 85. The amplifier 85, like the amplifier 78, has a balance poentiometer 86 and a filter network which includes a pair of resistors 87 and 88 which has a movable contact 89 and a parallel connected capacitor 90 for removing high frequency components which may be present at the input of the amplifier 85.

The output of the amplifier 85 is coupled through a line 91 and a resistor 92 to the input 93 of a further amplifier 94. As in the case of the amplifiers 78 and 85, the amplifier 94 has a balance potentiometer 95 and is provided with a ground as at 96.

As was indicated, means must be provided for supplying a desired input signal to the servo control system in order to determine the instantaneous power which must be applied to the buffing head in order to perform a prescribed buffing operation in keeping with the continuous forward movement of the bumper and in accord with the irregular contour of the surface being buffed. As has already been described, means are provided to sense the input power to the buffing motor. It has been discovered that input power to the motor is most linearly related to buffing head power, and accordingly, the power transducer 64 has been employed to generate a signal which at the circuit point 91 includes a first signal and a time differential signal both indicative respectively of the input power to the motor and the rate of change of power being applied to the buffing motor. However, to continuously control the power applied to the buffing motor, means must be provided to compare the signal which may be said to be a monitor signal as developed at the circuit point 91 with a desired signal which is indicative of the desired power at the buffing head at any given instant of time or at any given increment of advancement of the bumper 10 in its course beneath the buffing head.

Accordingly, the block system shown in FIG. 1 provides a number of discrete voltages at the output of the one hundred terminal switch 22 which are indicative of the desired power level or power which is desired to be applied to the buffing head at a given increment of positioning of the bumper 10 on the conveyor course. These voltage levels are applied through a resistor 97 to the circuit junction point 93 which is also the input to the amplifier 94. A power supply 98 is coupled to the switch 28 through a pair of contacts 99 and 100 which in turn applies the power of the power supply 98 across a resistor 101. A movable contact 102 couples the power of the power supply to the amplifier 94 as shown.

The amplifier 94 is also provided with a filter network which includes a pair of resistors 103 and 104, the resistor 104 being provided with a movable contact 105. Also, a capacitor 106 is provided in parallel with the resistor 103, and a second capacitor 107 is provided in parallel with the series combination of the resistors 103 and 104.

Accordingly, at the output of the amplifier 94, a signal is derived which is indicative of the difference between a desired or control signal as developed across the resistor 97 and an output or monitor signal as developed across the resistor 92. The signal at the output of the amplifier 94 then may be said to be a servo signal and may be used to control a servo mechanism for regulating the contact pressure of the buffing head at the bumper 10.

The output of the amplifier 94 as derived at circuit junction point 108 may be coupled to the input 109 of a power amplifier 110 or servo driver which in turn couples the servo signal to a pair of coils 111 and 112 which are grounded through a resistor 113 as at a circuit point 114. The coils 111 and 112 may be said to be servovalve coils. The servovalve in turn may be utilized to control pressurized hydraulic fluid delivered to a cylinder or other suitable hydraulic actuating device for the purpose of positioning a buffing head for increasing or decreasing the pressure of the buffing head against the moving variable contoured buffing surface of the bumper 10. The pressure of the buffing head against the bumper determines the buffing power which is measured by the watt transducer.

It will be apparent to those skilled in the art that the sensing of motor power is not the only way that the control system as described herein will function. The sensing of other parameters may be used. For instance, the normal force between the wheel and the work as measured with a force transducer at a bearing location could be used in conjunction with the above described control system to control the buffing head position for the following contours.

We claim as our invention:

1. In an automatic buffing system having a buffing head, motor means for driving said head into buffing contact with a product being buffed, and a conveyor for moving said product relative to said buffing head, a control system for regulating the power delivered to said motor means comprising:
   means for substantially sensing the instantaneous power applied to said buffing head,
   means for developing an output signal in response to said sensing means,
   means for generating a signal in response to each advancement of a given incremental length of said conveyor, a sequentially operative power selection device having a number of pre-arranged available power level sources, means for coupling said signals to said sequentially operative power selection device,
   said sequentially operative power selection device being responsive to each of said advancement signals for selecting in sequence one of a number of said pre-arranged power level sources,
   means for combining said selected power level source and said output signal, and
   means responsive to said combined power level source and output signal for increasing or decreasing the degree of contact of said buffing head with said product being buffed.

2. A control system in accordance with claim 1 wherein said means for generating said signals comprises a pulse generator, and means for keying the generating of pulses from said pulse generator to the movement of said conveyor, whereby the generating of each pulse corresponds to the movement of an increment of said conveyor past said buffing head.

3. An electronic control system in accordance with claim 1 wherein said means for substantially sensing the instantaneous power applied to said buffing head comprises means for sensing the instantaneous electrical power delivered to said motor means.

4. A control system in accordance with claim 1 wherein said means for coupling said signal to said sequentially operative power selection device comprises switch means and means for sensing the presence of a product on said conveyor and beneath said buffing head and for actuating said switch means in response thereto.

5. In an automatic buffing system having a buffing head, motor means for driving said head into buffing contact with a product being buffed, and a conveyor for moving said product relative ot said buffing head, a control system for regulating the power delivered to said motor means comprising:
   means for substantially sensing the instantaneous power applied to said buffing head,
   means for developing an output signal in response to said sensing means,
   means for generating a sequence of signals, each of said signals being associated with an increment of movement of said conveyor relative to said buffing head and each of said signals being generated following the movement of said associated increment past said buffing head, means for establishing a number of circuit points corresponding to a number of discrete power sources, means responsive to each one of said advancement signals for combining one of said power sources as developed at one of said circuit points with said control signal, and means responsive to said combined power level source and output signal for increasing or decreasing the degree of contact of said buffing head with said product being buffed.

6. An electronic control system in accordance with claim 5 wherein said means for substantially sensing the instantaneous power applied to said buffing head comprises means for sensing the instantaneous electrical power delivered to said motor means.

7. A control system in accordance with claim 5 wherein said means for generating a sequence of signals comprises a pulse generator, and means for keying the generating of pulses from said pulse generator to the movement of said conveyor, whereby the generating of each pulse corresponds to the movement of an increment of said conveyor past said buffing head.

8. A control system in accordance with claim 7 wherein said pulse generator comprises:
   a rotatable disc having a number of apertures arranged about the center thereof and means for rotating the same,
   a photo sensitive element,
   a light source and means for passing light therefrom through one of said apertures and for impinging the same on said photo sensitive element,
   circuit means including said photo sensitive element for generating a pulse each time one of said apertures is rotated into alignment with both said light source and said photo sensitive element.

9. In an automatic buffing system having buffing head, motor means for driving said head into buffing contact with a product being buffed, and a conveyor for moving said product relative to said buffing head, a control system for regulating the power delivered to said motor means comprising:
   means for sensing the instantaneous power delivered to said motor means and for developing a first signal indicative of the sensed power,
   means for developing a time differential of said first signal,
   means for combining said first signal and said time differential signal to develop an output signal thereby,
   means for generating a signal in response to each advancement of a given incremental length of said conveyor,
   a sequentially operative power selection device having a number of pre-arranged available power level sources,
   means for coupling said signals to said sequentially operative power selection device,
   said sequentially operative power selection device being responsive to each of said advancement signals for selecting in sequence one of a number of said pre-arranged power level sources,
   means for combining said output signal and said selected power level source,
   means responsive to said combined power level source and output signal for increasing or decreasing the degree of contact of said buffing head with said product being buffed.

10. A control system in accordance with claim 5 wherein said means for generating a signal in response to the advancement of a given incremental length of said conveyor comprises:
    a rotatable disc having a number of apertures arranged about the center thereof,
    means for rotating said disc at a fixed speed ratio to said conveyor,
    a photo sensitive element,
    a light source and means for passing light therefrom through one of said apertures and for impinging the same on said photo sensitive element,
    circuit means including said photo sensitive element for generating a pulse each time one of said apertures is rotated into alignment with said light source and said photo sensitive element.

11. In an automatic buffing system having a buffing head, motor means for driving said head into buffing contact with a product being buffed, and a conveyor for moving said product relative to said buffing head, a control system for regulating the power delivered to said motor means comprising:
    means for sensing the instantaneous power delivered to said motor means and for developing a first signal indicative of the sensed power,
    first amplifier means for increasing the magnitude of said first signal,
    means for developing a time differential of said first signal,
    combining means for said first signal and said time differential signal to develop an output signal thereby,
    pulse generator means having an output, means coupled to said pulse generator means for keying the generation of pulses therefrom to the advancement of said conveyor,
    a rotary switch means having a number of terminals, and an output means sequentially connectable to each of said terminals through the rotation of said switch,
    stepping motor means for advancing said rotary switch,
    means for coupling the output of said pulse generator to said stepping motor means,
    means for applying a given power level to each of said terminals of said rotory switch,
    means for combining said output signal and the output of said rotary switch,
    means for generating a servo signal in response to the combined output signals,
    said means for combining said signals including a common circuit point, and
    means for coupling the signals being combined to said common circuit point,
    said means for generating a servo signal including a second amplifier means and means for coupling said common circuit point to the input of said second amplifier means,
    said second amplifier means generating said servo signal in response to the algebraic sum of said output signals, and means responsive to said servo signal for increasing or decreasing the degree of contact of said buffing head at the product being buffed.

References Cited

UNITED STATES PATENTS

| | | | |
|---|---|---|---|
| 3,026,461 | 3/1962 | Lee | 318—432 X |
| 3,125,714 | 3/1964 | Eisengrein | 318—433 X |
| 3,239,724 | 3/1966 | Uranishi | 318—39 X |
| 3,259,023 | 7/1966 | Rieger et al. | 318—39 X |
| 3,271,909 | 9/1966 | Rutt et al. | 51—76 X |
| 3,035,765 | 2/1967 | Rittner | 318—39 X |
| 3,332,863 | 7/1967 | Woods | 318—39 X |
| 3,339,521 | 9/1967 | Spencer | 118—4 |
| 3,394,501 | 7/1968 | Carlson et al. | 51—165.03 X |

WALTER A. SCHEEL, Primary Examiner

L. G. MACHLIN, Assistant Examiner

U.S. Cl. X.R.

318—434